US008911698B2

(12) United States Patent
Choung et al.

(10) Patent No.: US 8,911,698 B2
(45) Date of Patent: Dec. 16, 2014

(54) SUPPORTED CATALYST FOR REMOVING NITROGEN OXIDES, METHOD OF PREPARING THE SAME, AND REMOVING METHOD OF NITROGEN OXIDES USING THE SAME

(71) Applicants: Hyundai Motor Company, Seoul (KR); Postech Academy-Industry Foundation, Pohang-si, Gyeongsangbuk-do (KR)

(72) Inventors: Jin Woo Choung, Suwon (KR); In-Sik Nam, Pohang (KR); Mun Kyu Kim, Pohang-si (KR); Pyung Soon Kim, Daejeon (KR); Byong-Kwon Cho, Pohang-si (KR)

(73) Assignees: Hyundai Motor Company, Seoul (KR); Postech Academy-Industry Foundation, Pohang-si, Gyeongsangbuk-Do (KR)

( * ) Notice: Subject to any disclaimer, the term of this patent is extended or adjusted under 35 U.S.C. 154(b) by 0 days.

(21) Appl. No.: 14/076,939

(22) Filed: Nov. 11, 2013

(65) Prior Publication Data
US 2014/0161694 A1 Jun. 12, 2014

(30) Foreign Application Priority Data

Dec. 10, 2012 (KR) .................. 10-2012-0142981

(51) Int. Cl.
| | | |
|---|---|---|
| *B01J 23/50* | (2006.01) | |
| *B01J 27/125* | (2006.01) | |
| *B01J 37/00* | (2006.01) | |
| *B01D 53/56* | (2006.01) | |
| *B01D 53/94* | (2006.01) | |
| *B01J 37/02* | (2006.01) | |
| *B01J 27/12* | (2006.01) | |
| *B01J 35/10* | (2006.01) | |
| *F01N 3/20* | (2006.01) | |

(52) U.S. Cl.
CPC ............ *B01J 27/125* (2013.01); *B01J 37/0205* (2013.01); *B01D 53/565* (2013.01); *B01J 23/50* (2013.01); *B01D 53/9418* (2013.01); *B01J 27/12* (2013.01); *B01J 35/1014* (2013.01); *B01J 35/1019* (2013.01); *F01N 3/2066* (2013.01)

USPC ......... 423/213.2; 423/239.1; 60/274; 60/299; 60/301; 502/231; 502/344; 502/347; 502/348; 502/439

(58) Field of Classification Search
USPC ..................... 502/344, 347, 348, 439, 231; 423/239.1, 213.2; 60/274, 299, 301
See application file for complete search history.

(56) References Cited

U.S. PATENT DOCUMENTS

| | | | | |
|---|---|---|---|---|
| 3,514,253 | A | * | 5/1970 | Robota ..................... 423/465 |
| 3,859,427 | A | * | 1/1975 | Francis et al. ............. 423/600 |
| 4,806,518 | A | * | 2/1989 | Boxhoorn et al. .......... 502/231 |
| 4,908,343 | A | | 3/1990 | Bhasin |
| 2006/0205962 | A1 | | 9/2006 | Rubinstein et al. |
| 2009/0177000 | A1 | | 7/2009 | Natal et al. |
| 2012/0172608 | A1 | | 7/2012 | Li et al. |
| 2013/0035463 | A1 | * | 2/2013 | Cann et al. ................ 526/226 |

FOREIGN PATENT DOCUMENTS

| | | |
|---|---|---|
| CN | 103071516 A | 5/2013 |
| JP | 51-13728 | 2/1976 |
| JP | 06-277521 A | 10/1994 |

OTHER PUBLICATIONS

Jong H. Lee, et al., "Improved NOx Reduction over the staged Ag/Al2O3 catalyst system," Applied Catalysis A: General 342 (2008) 78-86, Elsevier.

* cited by examiner

*Primary Examiner* — Timothy Vanoy
(74) *Attorney, Agent, or Firm* — McDermott Will & Emery LLP

(57) ABSTRACT

A supported catalyst for reduction reaction of nitrogen oxides includes a support and an silver (Ag)-based compound and aluminum fluoride which are immobilized in the support. A method for preparing the supported catalyst for reduction reaction of nitrogen oxides includes an impregnation step wherein aluminum fluoride, a hydrate or a salt thereof, and a silver (Ag)-based compound or a hydrate thereof are reacted with a support and a step of calcining the support. Nitrogen oxides in exhaust gas are removed by reacting with a reducing agent, in the presence of the supported catalyst for reduction reaction of nitrogen oxides. Wherein, the supported catalyst has an excellent nitrogen oxide removal efficiency at a practical exhaustion temperature of 270 to 400° C.

16 Claims, 3 Drawing Sheets

SUPPORTED CATALYST FOR REMOVING NITROGEN OXIDES, METHOD OF PREPARING THE SAME, AND REMOVING METHOD OF NITROGEN OXIDES USING THE SAME

CROSS-REFERENCE TO RELATED APPLICATION

This application claims the benefit of priority to Korean Patent Application No. 10-2012-0142981 filed in the Korean Intellectual Property Office on Dec. 10, 2012, the entire contents of which are incorporated herein by reference.

TECHNICAL FIELD

The present disclosure relates to a supported catalyst for reduction reaction of nitrogen oxides, a method for preparing the same, and a method for removing nitrogen oxides using the same. More specifically, the present disclosure relates to a supported catalyst having an excellent nitrogen oxide removal efficiency at a practical exhaustion temperature of 270 to 400° C., a method for preparing the same, and a method for removing nitrogen oxides in exhaust gas using the supported catalyst and a reducing agent.

BACKGROUND

A diesel vehicle is widely used due to its excellent gas mileage and small $CO_2$ discharge amount compared to a gasoline vehicle. However, nitrogen oxides (NOx) and particulate matter (PM) which are harmful to a human body and an environment are included in the exhaust gas of the diesel vehicle. Main regulation for diesel vehicle exhaustion is on the nitrogen oxides and particulate matter. Particularly, nitrogen oxide is a main cause of smog and acid rain, and thus, the regulation is being tightened. Therefore, technologies for removing nitrogen oxides from exhaust gas of automobiles, which are main causing materials of smog and acid rain and harmful to a human body and an environment, have been developed.

Conventionally, a selective catalytic reduction (SCR) method has been used to remove nitrogen oxides discharged from diesel engines, wherein the nitrogen oxides are converted to nitrogen and treated with a catalyst using a reducing agent. The selective catalytic reduction method selectively reduces the nitrogen oxides and converts to nitrogen using urea, hydrocarbon, and the like as the reducing agent and using a zeolite or alumina catalyst, and the like. Nitrogen oxide removal performance of Urea/SCR technology is known to be excellent. However, a zeolite catalyst used in the Urea/SCR technology has a low hydrothermal stability, a catalytic activity is easily lowered by $SO_2$ and hydrocarbons included in exhaust gas, and a storage tank is required for periodical injection of urea.

An HC/SCR technology, which was developed for solving various problems of the Urea/SCR technology, removes nitrogen oxides by directly using hydrocarbons or fuel discharged from exhaust gas as a reducing agent, and has a high catalytic reactivity and selectivity. However, the HC/SCR technology generates ammonia ($NH_3$) which is harmful to human body and cannot be removed with an $Ag/Al_2O_3$ catalyst that was widely used before.

It is known that diesel engine exhaust gas temperature of a diesel vehicle is about 150 to 250° C. for a light-duty vehicle, and about 200 to 350° C. for a heavy-duty vehicle (R. G. Gonzales, "Diesel Exhaust Emission System Temperature Test", T&D Report 0851-1816P, SDTDC, U.S. Department of Agriculture, December (2008)). Thus, a technology for a post-treatment of exhaust gas capable of removing discharged nitrogen oxides at a temperature of 350° C. or less is required. Further, the $Ag/Al_2O_3$ catalyst widely used in HC/SCR exhibits an excellent nitrogen oxide removal efficiency at a temperature of 300° C. or more, but exhibits a low activity at a temperature of 300° C. or less.

Accordingly, there is a demand for development of a catalyst having an excellent removal efficiency of ammonia ($NH_3$) generated during a reduction reaction and improved nitrogen oxide removal performance at a low temperature that is a practical temperature of exhaust gas.

SUMMARY

The present disclosure provides a supported catalyst for reduction reaction of nitrogen oxides, which may reduce nitrogen oxides with a high efficiency, and more particularly, may reduce nitrogen oxides with a higher efficiency compared to previously known catalyst at a low temperature range, for example, 350° C. or less.

According to an exemplary embodiment of the present disclosure, a supported catalyst for reduction reaction of nitrogen oxides includes a support. A silver (Ag)-based compound and aluminum fluoride are immobilized in the support.

According to another exemplary embodiment of the present disclosure, a method for preparing a supported catalyst for reduction reaction of nitrogen oxides includes a step of impregnation wherein aluminum fluoride, a hydrate or a salt thereof, and an Ag-based compound or the hydrate thereof are reacted with a support, and a step of calcining the support.

The method may further include a step of drying a product obtained in the impregnation step at 90 to 150° C. for 1 to 24 hours.

A method for removing nitrogen oxides in exhaust gas comprises exhaust gas including nitrogen oxides reacting with a reducing agent in the presence of the supported catalyst for reduction reaction of nitrogen oxides.

DETAILED DESCRIPTION OF THE EMBODIMENTS

Figure 1:
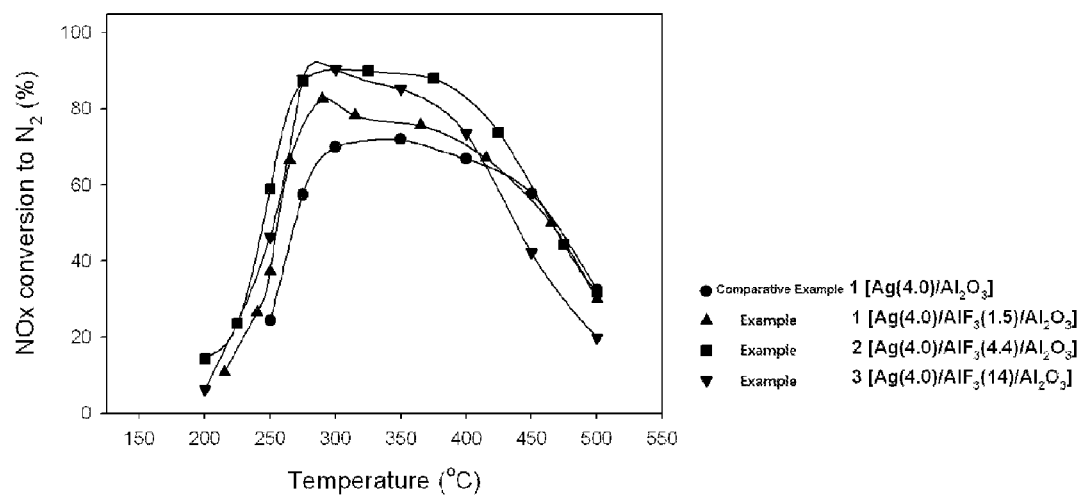
FIG. 1 is a graph showing a conversion of nitrogen oxides to nitrogen ($N_2$) according to processes of Examples 1 to 3 and Comparative Example 1.

Hereinafter, a supported catalyst for reduction reaction of nitrogen oxides, a preparation method thereof, and a method for removing nitrogen oxides using the same according to specific embodiments of the disclosure will be explained in detail with reference to the Examples and drawings.

Results of the study for improving low nitrogen oxide removal efficiency at a low temperature of 350° C. or less to solve the problems of the previous nitrogen oxide removal technology confirm that a supported catalyst for reduction reaction of nitrogen oxides including an Ag-based compound and aluminum fluoride bound to a specific carrier may remove or reduce nitrogen oxides with a higher efficiency at a practical exhaust gas temperature, for example, a temperature of 270 to 400° C., particularly even at a low temperature range of 300° C. or less.

When the above-mentioned supported catalyst is used, a conversion of harmful ammonium ($NH_3$), that has been previously generated when converting nitrogen oxides to nitrogen, is largely improved, and thus, the nitrogen oxides in exhaust gas may be more effectively removed.

The term 'reduction reaction of nitrogen oxides' refers to a whole process during which a reaction between nitrogen oxides and a reducing agent is conducted. Specifically, the reduction reaction of the nitrogen oxides may include a step of reducing nitrogen oxides to generate nitrogen or ammonia, and it may further include a step of converting an intermediate or by-products (for example, ammonia, and the like) generated during the reaction process to a final product (for example, nitrogen).

According to an embodiment of the present disclosure, a supported catalyst for reduction reaction of nitrogen oxides includes a support. Wherein a silver (Ag)-based compound and aluminum fluoride are immobilized in the support.

The support may include those known to be usable in a reduction reaction of nitrogen oxides, and the like, without specific limitations. Examples of the support may include alumina, natural or artificial zeolite, natural or artificial bentonite, clay, fly ash, active carbon, active silica, titanium dioxide, calcium carbonate, or a mixture thereof, and alumina.

The alumina may have an α, γ, η, δ, or θ type crystalline structure. To achieve a better reduction reaction of the nitrogen oxides, an alumina support having the γ structure may be used. Particularly, $\gamma$-$Al_2O_3$ is suitable for the support due to its relatively large specific surface area compared to other alumina, and thus uniformly distributing a small amount of supported metal.

The support may have specific surface area, Brunauer-Emmett-Teller (BET) of 10 to 300 $m^2/g$ or 150 to 200 $m^2/g$. If the specific surface area of the support is too small, a bound or immobilized Ag-based compound and aluminum fluoride may not be uniformly distributed, and thus, the activity of the supported catalyst may be lowered.

The aluminum fluoride, a hydrate or a salt thereof may increase acid sites formed on the surface of the supported catalyst or support. By using the aluminum fluoride, ammonia additionally generated in the reduction reaction of the nitrogen oxides may be more effectively adsorbed, and the adsorbed ammonia may be more effectively converted to nitrogen.

The supported catalyst may include 0.5 to 30 wt. % of the aluminum fluoride, 0.5 to 20 wt. % of the aluminum fluoride, or 1 to 15 wt. % of the aluminum fluoride, based on total weight of the catalyst. If the content of the aluminum fluoride is less than 0.5 wt. % or greater than 30 wt. %, the conversion of the nitrogen oxides to the nitrogen may be decreased at a low temperature or a high temperature.

The Ag-based compound refers to a compound including silver, and includes silver, an organic compound of silver, or an acid salt or a base salt of the silver. Examples of the Ag-based compound may include silver (Ag), silver oxide (AgO), silver chloride (AgCl), silver nitrate ($AgNO_3$), silver sulfate ($Ag_2SO_3$), or a mixture thereof.

The supported catalyst may include the Ag-based compound in the content of 0.1 to 15 wt. %, 1 to 10 wt. %, or 2 to 8 wt. %, based on total weight of the catalyst. If the content of the Ag-based compound is less than 0.1 wt. %, the absolute amount of the Ag-based compound acting as a catalyst may become small, and thus, the catalyst performance may be lowered. If it is greater than 15 wt. %, an excessive amount of metal silver may unnecessarily exist, and thus, the activity of the supported catalyst may be lowered.

According to another embodiment of the disclosure, a method for preparing a supported catalyst for reduction reaction of nitrogen oxides includes a step of impregnation wherein aluminum fluoride, a hydrate or a salt thereof, and an Ag-based compound or a hydrate thereof are reacted with a support, and a step of calcining the support.

As explained above, the supported catalyst for the reduction reaction of nitrogen oxides may reduce nitrogen oxides, and particularly, reduce nitrogen oxides with a higher efficiency compared to previously known catalyst, at a low temperature range, for example 350° C. or less. The supported catalyst may further remove nitrogen oxides in the exhaust gas more effectively since a capability of converting harmful ammonia ($NH_3$) that has been previously generated when removing nitrogen oxides to nitrogen is largely improved.

The impregnation step may include a solution including aluminum fluoride, a hydrate or a salt thereof, or a solution including an Ag-based compound or a hydrate thereof reacting with the support for 1 to 24 hours or for 1 to 5 hours.

The solution including aluminum fluoride, the hydrate or the salt thereof, or the solution including the Ag-based compound or the hydrate thereof may be an aqueous solution. The aqueous solution may include water, alcohol, amine or ammonium salt, and the like. The solution may be an aqueous solution including water considering solubility of aluminum fluoride.

The preparation method may further include a step of drying the product obtained in the impregnation step at 90 to 150° C. for 1 to 24 hours. In the drying step, a reaction product of aluminum fluoride, the hydrate or the salt thereof with the support, or a reaction product of the Ag-based compound or the hydrate thereof with the support may be dried at 90 to 150° C. or 100 to 120° C. for 1 to 24 hours or 5 to 15 hours.

In the drying process, commonly known drying method and apparatus may be used, for example, heat source such as an air heater, an oven, a heating plate, and the like may be used to progress drying.

In the impregnation step, the sequence of impregnating in the support is not significantly limited, for example, aluminum fluoride, the hydrate or the salt thereof, and the Ag-based compound or the hydrate thereof may be simultaneously impregnated in the support, or the two ingredients may be sequentially impregnated in the support.

However, in order to afford a better activity of the prepared catalyst, aluminum fluoride, the hydrate, or the salt thereof may be bound to the support in the impregnation step. Specifically, main reaction active sites of the supported catalyst may be the Ag-based compound or the hydrate thereof. If the aluminum fluoride, the hydrate, or the salt thereof is bound to the support first, and the Ag-based compound or the hydrate thereof is supported, more active sites may be uniformly distributed, and the activity of the catalyst may be more improved.

As explained above, since the aluminum fluoride, or the hydrate or the salt thereof may increase acid sites formed on the surface of the support or the supported catalyst, ammonium that is additionally generated in the reduction reaction of nitrogen oxides may be more effectively adsorbed, and the adsorbed ammonia may be more effectively converted to nitrogen. The impregnation step may include the aluminum fluoride, the hydrate, or the salt thereof reacting with the support and calcining and the calcined support reacting with the Ag-based compound or the hydrate thereof and recalcining.

The calcining step may be conducted at 300 to 1000° C. or 300 to 600° C. for 1 to 24 hours or 2 to 10 hours. If the temperature is too low in the calcining step, a solution including the aluminum fluoride, the hydrate or the salt thereof, or the Ag-based compound or the hydrate thereof may not be sufficiently bound to the support in the impregnation step, or the activity of the prepared supported catalyst may not be sufficiently achieved. If the temperature is too high in the calcining step, specific surface area of the prepared supported catalyst may be decreased, or the size of the Ag may become large, and supported aluminum fluoride may be decomposed to significantly lower the activity or property of the prepared supported catalyst.

According to another embodiment of the present disclosure, a method for removing nitrogen oxides in exhaust gas includes reacting exhaust gas including nitrogen oxides with a reducing agent, in the presence of the above explained supported catalyst for reduction reaction of nitrogen oxides.

As explained above, by using the supported catalyst for reduction reaction of nitrogen oxides according to an embodiment of the present disclosure, the amount of nitrogen oxides may be reduced, and more particularly, nitrogen oxides may be reduced with a higher efficiency compared to previously known catalysts, at a low temperature range, for example, 350° C. or less. The supported catalyst may remove the nitrogen oxides more effectively because a capability of converting harmful ammonia ($NH_3$) that has been previously generated when converting nitrogen oxides to nitrogen is largely improved.

The nitrogen oxides refer to a compound consisting of nitrogen and oxygen, or a mixture thereof, and specific examples thereof may include nitrogen monoxide (NO), nitrogen dioxide ($NO_2$), dinitrogen monoxide ($N_2O$), dinitrogen trioxide ($N_2O_3$), dinitrogen tetraoxide ($N_2O_4$), dinitrogen pentaoxide ($N_2O_5$), and the like.

The exhaust gas refers to a gas exhausted outside from an exhaust pipe of an engine and includes water (water vapor) generated by combustion of fuel, carbon dioxide, remaining air, unburned hydrocarbons, carbon monoxide, nitrogen oxides, and the like.

As the reducing agent, at least one selected from the group consisting of ethanol, dodecane, and metaxylene may be used, and the used amount of the reducing agent may be appropriately controlled according to the amount and concentration of nitrogen oxides to be removed. For example, in the method for removing nitrogen oxides, the reducing agent may be used in an amount of 400 to 3200 ppmv or 1600 to 2400 ppmv, based on carbon ($C_1$) in total reactant.

In the method for removing nitrogen oxides, the used amount of the supported catalyst for reduction reaction of nitrogen oxides may be appropriately controlled according to the amount and concentration of nitrogen oxides or the used amount of the reducing agent. For example, the supported catalyst for reduction reaction of nitrogen oxides may be used in an amount of 50 to 500 ppmv or 200 to 400 ppmv in total reactant.

The reduction reaction may be conducted at a temperature of 150 to 600° C. at a space velocity of 100 to 200,000 $h^{-1}$. The space velocity (SV) is a value obtained by dividing the amount of treated exhaust gas per 1 hour by catalyst capacity and represents an infiltration rate of treated exhaust gas for catalyst capacity filled for 1 hour. It may conduct the reaction under the above conditions for nitrogen oxide removal efficiency. The removal activity of nitrogen oxides in the exhaust gas may be 80% at a reduction reaction temperature of 270 to 400° C.

Hereinafter, the present disclosure will be explained with reference to the following Examples. However, these examples are only to illustrate the disclosure, and the scope of the disclosure is not limited thereto.

Preparation Examples 1 to 3

Preparation of a Supported Catalyst for Reduction Reaction of Nitrogen Oxides $AlF_3 \cdot 3H_2O$ was impregnated in $\gamma$-$Al_2O_3$ (BET=207 $m^2/g$) such that the content of $AlF_3$ supported in $\gamma$-$Al_2O_3$ may become 1.5, 4.4, and 14 wt. %, respectively (Preparation Examples 1, 2, and 3). Each of them was dried in an oven of 110° C. for 12 hours, and then, calcined at 550° C. for 5 hours to prepare a $AlF_3/Al_2O_3$ catalyst. An $AgNO_3$ solution was impregnated in the prepared $AlF_3/Al_2O_3$ catalyst such that the content of Ag may become 4 wt. %. Each of them was dried again in an oven of 110° C. for 12 hours, and then, calcined at 550° C. for 5 hours to prepare a $Ag/AlF_3/Al_2O_3$ catalyst.

Examples and Comparative Examples

Reduction of Nitrogen Oxides in Exhaust Gas Using a Supported Catalyst

Examples 1 to 3

The $Ag/AlF_3/Al_2O_3$ catalysts prepared in Preparation Examples 1 to 3 were introduced in a catalytic reaction apparatus. Before measuring a removal activity of nitrogen oxides, pre-treatment was conducted at 550° C. for 2 hours in the presence of mixed gas of 2.5 vol % $H_2O$, 6 vol % $O_2$, and the remaining amount of He.

Figure 2:
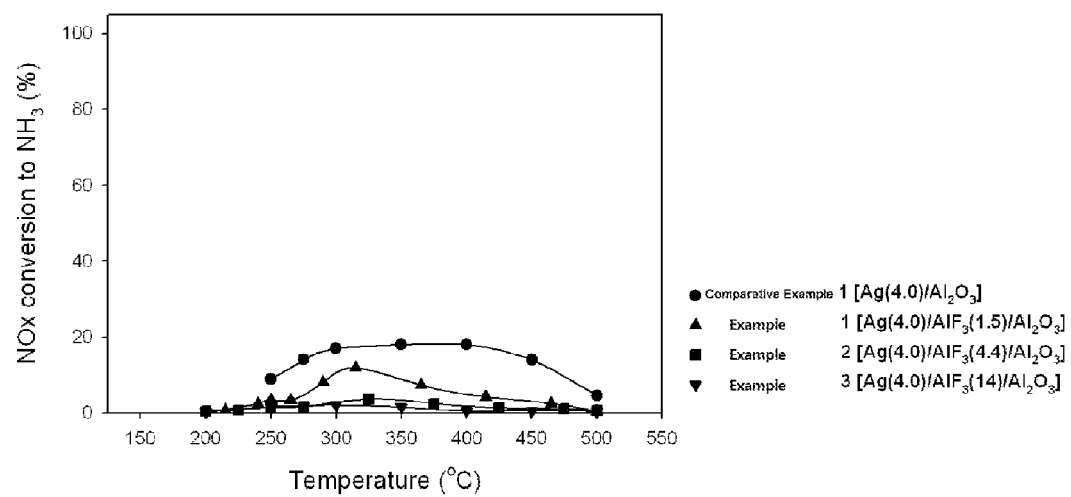
FIG. 2 is a graph showing a conversion of nitrogen oxides to ammonia ($NH_3$) according to processes of Examples 1 to 3 and Comparative Example 1.

After the pre-treatment, 400 ppmv of NO, 2.5 vol % of $H_2O$, 6 vol % of $O_2$, and the remaining amount of He were injected, and as a reducing agent, 640 ppmv of $C_2H_5OH$, 17 ppmv of $C_{12}H_{26}$, and 15 ppmv of $C_8H_{10}$ were injected. Wherein, a space velocity was 60,000 $h^{-1}$, and activities were measured at a reaction temperature of 200 to 500° C. Measurements at each reaction temperature, a steady state was maintained for 2 hours, and the mixing ratio of carbon/nitrogen oxides ($C_1/NO_x$) was 4. From the results, the ratio of the concentration of produced nitrogen or ammonia to the concentration of injected nitrogen oxides was calculated. FIGS. 1 and 2 show conversions of nitrogen oxides to nitrogen and nitrogen oxides to ammonia, respectively.

Comparative Example 1

To compare with Examples 1 to 3, an $Ag/Al_2O_3$ catalyst having Ag content of 4 wt. % was prepared, a catalytic reaction was conducted by the same method as Examples 1 to 3, and the results were shown in FIGS. 1 and 2.

Comparative Example 2

Figure 3:
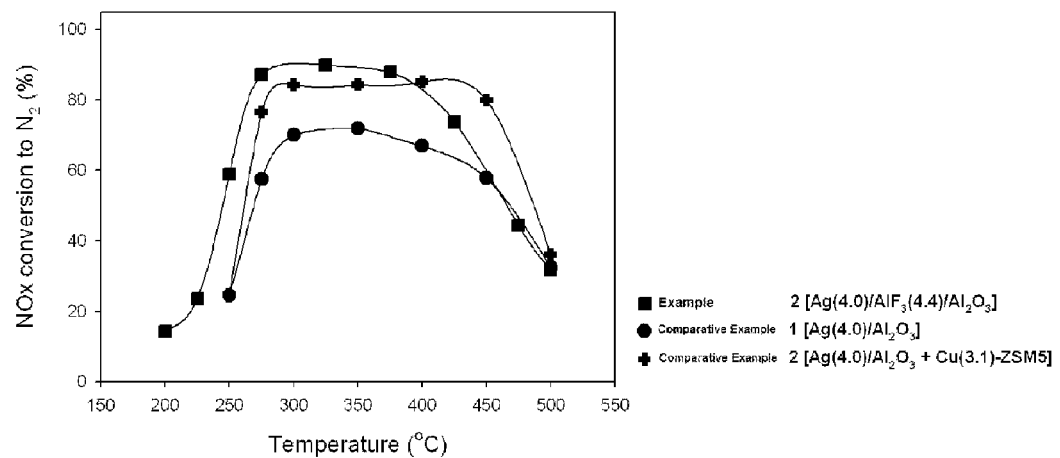
FIG. 3 is a graph showing a conversion of nitrogen oxides to nitrogen ($N_2$) according to processes of Example 2 and Comparative Examples 1 and 2.

A catalytic reaction was conducted by the same method as Example 2, except using a catalyst system consisting of an $Ag/Al_2O_3$ catalyst (a first catalyst layer) and a Cu-ZSM5 catalyst (a second catalyst layer), wherein the volume ratio of the first catalyst layer:the second catalyst layer=1:1. The first catalyst layer was used as an inlet catalyst, and the volumes of the inlet catalyst and the outlet catalyst were made identical. The space velocity of the reactor was 60,000 h$^{-1}$. The total volume of the first catalyst and the second catalyst used in Comparative Example 2 was identical to the volume of the catalyst used in Example 2. From the results, FIG. 3 shows the ratio of produced nitrogen to the concentration of injected nitrogen oxides was calculated, and conversion (%) of nitrogen oxides to nitrogen.

Example 4

To confirm ammonia oxidation capacity of the Ag(4.0)/AlF$_3$(4.4)/Al$_2$O$_3$ catalyst prepared in Preparation Example 2, 400 ppmv of NH$_3$, 2.5 vol % of H$_2$O, 6 vol % of O$_2$, and the remaining amount of He were injected as a reaction gas. The space velocity was 60,000 h$^{-1}$, and a steady state was maintained at a reaction temperature of 200 to 500° C. respectively for 2 hours, and then, activities were measured at each reaction temperature. From these results, FIGS. 4 to 6 describe an ammonia conversion, a conversion of ammonia to nitrogen oxides, and a conversion of ammonia to nitrogen, respectively.

Comparative Example 3

Figure 4:
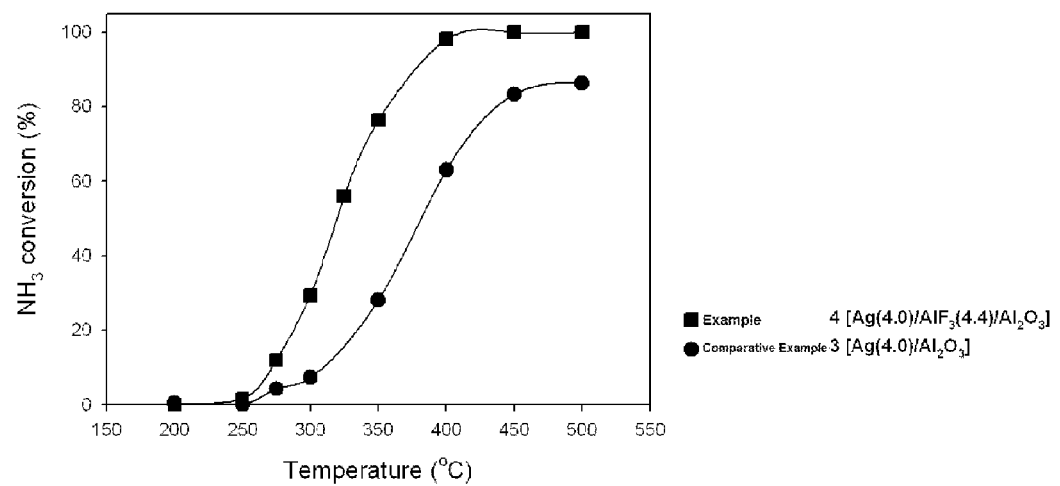
FIG. 4 is a graph showing an ammonia conversion according to processes of Example 4 and Comparative Example 3.
Figure 5:
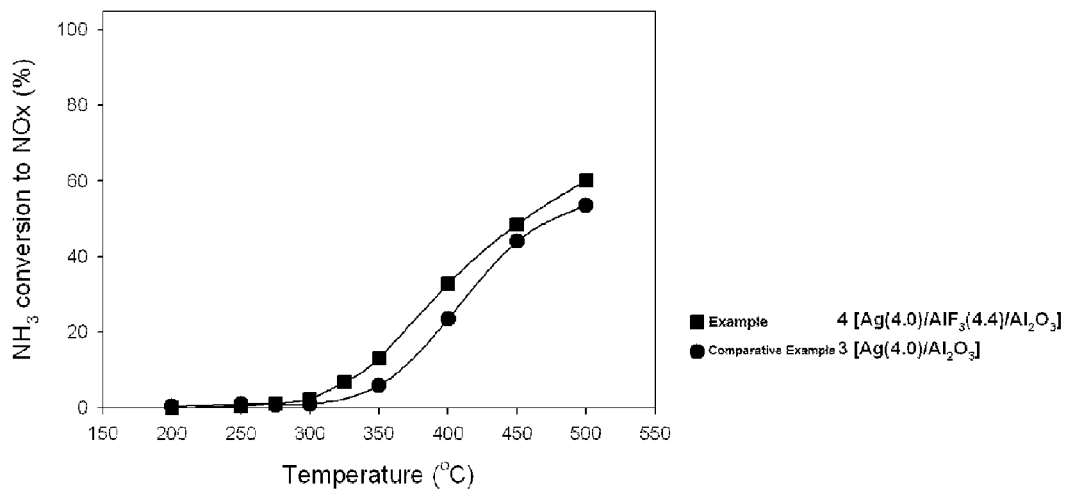
FIG. 5 is a graph showing a conversion of ammonia to nitrogen oxide (NOx) according to processes of Example 4 and Comparative Example 3.
Figure 6:
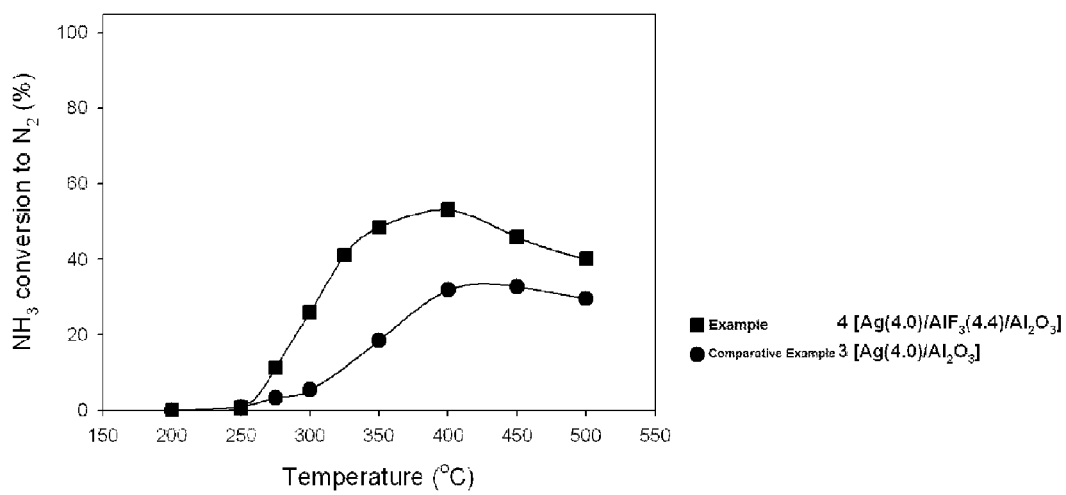
FIG. 6 is a graph showing a conversion of ammonia to nitrogen ($N_2$) according to processes of Example 4 and Comparative Example 3.

To compare with Example 4, an Ag/Al$_2$O$_3$ catalyst having Ag content of 5 wt. % was prepared, a catalytic reaction was conducted by the same method as Example 4, and the results were shown in FIGS. 4 to 6.

[Comparison of Results]

FIGS. 1 and 2 are graphs showing the conversions of nitrogen oxides to nitrogen and nitrogen oxides to ammonia according to the reaction temperatures in Examples 1 to 3 and Comparative Example 1. Examples 1 to 3 in FIGS. 1 and 2 denote Ag/AlF$_3$/Al$_2$O$_3$ catalysts including 1.5 to 14 wt. % of AlF$_3$, and Comparative Example 1 denotes an Ag/Al$_2$O$_3$ catalyst without AlF$_3$.

Referring to FIG. 1, according to Examples 1 to 3 using catalysts including 1.5 to 14 wt. % of AlF$_3$, the conversions of nitrogen oxides to nitrogen increase compared to Comparative Example 1 using a catalyst without AlF$_3$. Particularly, Example 2 [Ag(4.0)/AlF$_3$(4.4)/Al$_2$O$_3$] exhibits the activity increase of 20% or more compared to Comparative Example 1 [Ag(4.0)/Al$_2$O$_3$] and the excellent nitrogen oxide removal activity at a temperature range of 250 to 400° C.

Referring to FIG. 2, according to Examples 1 to 3 using catalyst including AlF$_3$, the ammonia production was lower compared to Comparative Example 1 using the catalyst without AlF$_3$. Particularly, as AlF$_3$ content increases, less ammonia is produced. When AlF$_3$ content is 4.4 wt. % or more (Examples 2 and 3), ammonia is not substantially produced over the whole reaction temperature range. From these results, it can be seen that the conversion of nitrogen oxides to nitrogen increases due to decrease in ammonia production.

FIG. 3 is a graph showing the conversions of nitrogen oxides to nitrogen according to the reaction temperature in Example 2 and Comparative Examples 1 and 2. Example 2 denotes an Ag/AlF$_3$/Al$_2$O$_3$ catalyst including 4.4 wt. % of AlF$_3$, Comparative Example 1 denotes an Ag/Al$_2$O$_3$ catalyst without AlF$_3$, and Comparative Example 2 denotes a catalyst system consisting of an Ag/Al$_2$O$_3$ catalyst (a first catalyst layer) and a Cu-ZSM5 catalyst (a second catalyst layer). The total volume of the first catalyst and the second catalyst used in Comparative Example 2 is identical to the volume of the catalyst used in Comparative Example 1 or Example 3.

Referring to FIG. 3, Example 2 using the catalyst including AlF$_3$ exhibits a more excellent activity than Comparative Examples using the catalyst without AlF$_3$. Particularly, it exhibits the more excellent activity at a temperature range of 200 to 400° C. than Comparative Example 2 using a double-layered catalyst system known to exhibit an excellent nitrogen oxide removal activity. From these results, it can be seen that the Ag/AlF$_3$/Al$_2$O$_3$ catalyst prepared according to the present disclosure exhibits an excellent activity at low temperature without using two kinds of catalysts (Ag/Al$_2$O$_3$+Cu-ZSM5) to increase the nitrogen oxide removal activity.

FIGS. 4 to 6 are graphs showing the ammonia conversion, the conversion of ammonia to nitrogen oxide, and the conversion of ammonia to nitrogen, respectively according to the reaction temperatures in Example 4 and Comparative Example 3. Example 4 denotes the Ag/AlF$_3$/Al$_2$O$_3$ catalyst including 4.4 wt. % of AlF$_3$, and Comparative Example 3 denotes the Ag/Al$_2$O$_3$ catalyst without AlF$_3$.

Referring to FIG. 4, Example 4 using the catalyst including 4.4 wt. % of AlF$_3$ exhibits a significant increase in the ammonia conversion at a temperature range of 275 to 500° C. compared to Comparative Example 3 using the catalyst without AlF$_3$. Particularly, it exhibits an activity increase of 30% or more and an excellent ammonia conversion at a temperature range of 300 to 400° C. From these results, it can be seen that the catalyst including AlF$_3$ has the excellent ammonia removal capacity.

Referring to FIG. 5, although Example 4 using the catalyst including 4.4 wt. % of AlF$_3$ exhibits the higher conversion of ammonia to nitrogen oxides than Comparative Example 3 using the catalyst without AlF$_3$, the increase is 10% or less.

Referring to FIG. 6, Example 4 using the catalyst including 4.4 wt. % of AlF$_3$ exhibits a significant increase in the conversion of ammonia to nitrogen compared to Comparative Example 3 using the catalyst without AlF$_3$. Particularly, at a temperature range of 300 to 400° C. where the ammonia conversion is high in FIG. 6, the conversion of ammonia to nitrogen also increases significantly. From these results, it can be seen that the catalyst including AlF$_3$ has a significantly improved capability in converting ammonia to nitrogen.

The present disclosure is not limited to the Examples and may be conducted in various forms, and it is understood by one of ordinary knowledge in the art that the present disclosure may be practiced in other specific forms without modifying technical idea or essential characteristics of the disclosure. Therefore, it should be understood that the above described Examples are illustrative and not limiting.

What is claimed is:

1. A supported catalyst for reduction reaction of nitrogen oxides, comprising:
    a support having a specific surface area (BET) of 10 to 300 m$^2$/g; and
    an silver (Ag)-based compound and aluminum fluoride which are immobilized in the support.

2. The supported catalyst for reduction reaction of nitrogen oxides according to claim 1, wherein the support comprises at least one selected from the group consisting of alumina, natural, or artificial zeolite, natural or artificial bentonite, clay, fly ash, active carbon, active silica, titanium dioxide, and calcium carbonate.

3. The supported catalyst for reduction reaction of nitrogen oxides according to claim 2, wherein the support is alumina having an α, γ, η, δ, or θ type crystalline structure.

4. The supported catalyst for reduction reaction of nitrogen oxides according to claim 1, comprising:

0.5 to 30 wt. % of the aluminum fluoride;
0.1 to 15 wt. % of the Ag-based compound; and
a remaining content of the support.

5. The supported catalyst for reduction reaction of nitrogen oxides according to claim 1, wherein the Ag-based compound is silver (Ag), silver oxide (AgO), silver chloride (AgCl), silver nitrate ($AgNO_3$), silver sulfate ($Ag_2SO_3$), or a mixture thereof.

6. A method for preparing a supported catalyst for reduction reaction of nitrogen oxides, comprising:
    an impregnation step wherein aluminum fluoride, a hydrate or a salt thereof, and a silver (Ag)-based compound or the hydrate thereof are reacted with a support; and
    a step of calcining the support.

7. The method for preparing a supported catalyst for reduction reaction of nitrogen oxides according to claim 6, wherein the impregnation step comprises a solution including aluminum fluoride, the hydrate or the salt thereof, or a solution including the Ag-based compound or the hydrate thereof reacting with the support for 1 to 24 hours.

8. The method for preparing a supported catalyst for reduction reaction of nitrogen oxides according to claim 6, further comprising a step of drying a product obtained in the impregnation step at 90 to 150° C. for 1 to 24 hours.

9. The method for preparing a supported catalyst for reduction reaction of nitrogen oxides according to claim 6, wherein the impregnation step comprises aluminum fluoride, the hydrate or the salt thereof reacting with the support and calcining, and reacting the calcined support with the Ag-based compound or the hydrate thereof and recalcining.

10. The method for preparing a supported catalyst for reduction reaction of nitrogen oxides according to claim 6, wherein the calcining step is conducted at 300 to 1000° C. for 1 to 24 hours.

11. A method for removing nitrogen oxides in exhaust gas, comprising exhaust gas including nitrogen oxides reacting with a reducing agent, in the presence of the supported catalyst for reduction reaction of nitrogen oxides according to claim 1.

12. The method for removing nitrogen oxide according to claim 11, wherein a content of the supported catalyst for reduction reaction of nitrogen oxides in a reactant is 50 to 500 ppmv.

13. The method for removing nitrogen oxide according to claim 11, wherein a content of the reducing agent in a reactant is 400 to 3200 ppmv.

14. The method for removing nitrogen oxide according to claim 11, wherein the reducing agent is at least one selected from a group consisting of ethanol, dodecane, and metaxylene.

15. The method for removing nitrogen oxide according to claim 11, wherein the reduction reaction is conducted at a temperature of 150 to 600° C. at a space velocity of 100 to 200,000 $h^{-1}$.

16. The method for removing nitrogen oxide according to claim 11, wherein a removal activity of nitrogen oxides in the exhaust gas is 80% or more at a reduction reaction temperature of 270 to 400° C.

* * * * *